United States Patent
Thayer et al.

(10) Patent No.: US 7,698,425 B2
(45) Date of Patent: *Apr. 13, 2010

(54) SYSTEMS FOR MANAGING A DOMAIN NAME REGISTRANT'S SOCIAL WEBSITES

(75) Inventors: Wayne Thayer, Phoenix, AZ (US); Craig Condit, Scottsdale, AZ (US); John Paxton, Phoenix, AZ (US)

(73) Assignee: The Go Daddy Group, Inc., Scottsdale, AZ (US)

( * ) Notice: Subject to any disclaimer, the term of this patent is extended or adjusted under 35 U.S.C. 154(b) by 214 days.

This patent is subject to a terminal disclaimer.

(21) Appl. No.: 12/024,785

(22) Filed: Feb. 1, 2008

(65) Prior Publication Data

US 2008/0114868 A1    May 15, 2008

(51) Int. Cl.
 *G06F 15/173* (2006.01)
(52) U.S. Cl. ................................. 709/225; 709/223
(58) Field of Classification Search ................. 709/223, 709/226, 230, 224, 245, 225; 707/10, 7; 706/12

See application file for complete search history.

(56) References Cited

U.S. PATENT DOCUMENTS

| 7,047,202 | B2 | 5/2006 | Jaipuria et al. |
| 7,117,254 | B2 | 10/2006 | Lunt et al. |
| 2004/0073691 | A1* | 4/2004 | Sun ............................. 709/230 |
| 2004/0205200 | A1 | 10/2004 | Kothari et al. |
| 2005/0044423 | A1 | 2/2005 | Mellmer et al. |
| 2005/0159998 | A1 | 7/2005 | Buyukkokten et al. |
| 2005/0267940 | A1 | 12/2005 | Galbreath et al. |
| 2006/0195609 | A1* | 8/2006 | Han ............................. 709/245 |
| 2007/0083560 | A1 | 4/2007 | Choi et al. |
| 2007/0162458 | A1 | 7/2007 | Fasciano |
| 2007/0214097 | A1* | 9/2007 | Parsons et al. ................. 706/12 |
| 2007/0266141 | A1* | 11/2007 | Norton ....................... 709/224 |
| 2008/0005127 | A1* | 1/2008 | Schneider .................... 707/10 |
| 2008/0114867 | A1 | 5/2008 | Thayer et al. |
| 2008/0147659 | A1* | 6/2008 | Chen et al. ..................... 707/7 |

OTHER PUBLICATIONS

Nov. 2, 2009 non-final rejection in related U.S. Appl. No. 12/024,793.
Jan. 20, 2010 reply to Nov. 2, 2009 non-final rejection in related U.S. Appl. No. 12/024,793.
Nov. 18, 2009 non-final rejection in related U.S. Appl. No. 12/024,802.
Jan. 27, 2010 reply to Nov. 18, 2009 non-final rejection in related U.S. Appl. No. 12/024,802.

* cited by examiner

*Primary Examiner*—Le Luu
(74) *Attorney, Agent, or Firm*—Karl A. Fazio

(57) ABSTRACT

Systems of the present invention allow for managing multiple social websites. An exemplary system may comprise means for registering a domain name to a Registrant, at least one social website, and a Personal Portal Website communicatively coupled to the registering means and social website(s). The Personal Portal Website also may comprise means for generating a Social Domain (possibly by concatenating at least one subdomain to the Registrant's domain name), means for mapping the Social Domain to a URL for the Registrant's public webpage on his social website(s), and means for displaying the Registrant's public webpage(s) when the Social Domain is entered in a browser.

11 Claims, 9 Drawing Sheets

SYSTEMS FOR MANAGING A DOMAIN NAME REGISTRANT'S SOCIAL WEBSITES

CROSS REFERENCE TO RELATED PATENT APPLICATIONS

This patent application is related to the following concurrently-filed patent applications:

U.S. patent application Ser. No. 12/024,764, "AN INTERNET PORTAL FOR MANAGING SOCIAL WEBSITES."

U.S. patent application Ser. No. 12/024,793, "USING SOCIAL DOMAINS TO MANAGE A DOMAIN NAME REGISTRANT'S SOCIAL WEBSITES."

U.S. patent application Ser. No. 12/024,802, "PROVIDING AUTHENTICATED ACCESS TO MULTIPLE SOCIAL WEBSITES."

The subject matter of all patent applications is commonly owned and assigned to The Go Daddy Group, Inc. All prior applications are incorporated herein in their entirety by reference.

FIELD OF THE INVENTION

The present inventions generally relate to the field of the Internet-based social networks and, more specifically, systems and methods for managing multiple social websites.

BACKGROUND OF THE INVENTION

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers place multimedia information (e.g., text, graphics, audio, video, animation, and other forms of data) at specific locations on the Internet referred to as webpages. Websites comprise a collection of connected, or otherwise related, webpages. The combination of all the websites and their corresponding webpages on the Internet is generally known as the World Wide Web (WWW) or simply the Web.

For Internet users and businesses alike, the Internet continues to be increasingly valuable. People are increasingly using the Web for everyday tasks such as social networking, shopping, banking, paying bills, and consuming media and entertainment. E-commerce is growing, with businesses delivering more services and content across the Internet, communicating and collaborating online, and inventing new ways to connect with each other.

Some Internet users, typically those that are larger and more sophisticated, may provide their own hardware, software, and connections to the Internet. But many Internet users either do not have the resources available or do not want to create and maintain the infrastructure necessary to host their own websites. To assist such individuals (or entities), hosting companies exist that offer website hosting services. These hosting providers typically provide the hardware, software, and electronic communication means necessary to connect multiple websites to the Internet. A single hosting provider may literally host thousands of websites on one or more hosting servers.

Websites may be created using HyperText Markup Language (HTML) to generate a standard set of tags that define how the webpages for the website are to be displayed. Users of the Internet may access content providers' websites using software known as an Internet browser, such as MICROSOFT INTERNET EXPLORER or MOZILLA FIREFOX. After the browser has located the desired webpage, it requests and receives information from the webpage, typically in the form of an HTML document, and then displays the webpage content for the user. The user then may view other webpages at the same website or move to an entirely different website using the browser.

Browsers are able to locate specific websites because each website, resource, and computer on the Internet has a unique Internet Protocol (IP) address. Presently, there are two standards for IP addresses. The older IP address standard, often called IP Version 4 (IPv4), is a 32-bit binary number, which is typically shown in dotted decimal notation, where four 8-bit bytes are separated by a dot from each other (e.g., 64.202.167.32). The notation is used to improve human readability. The newer IP address standard, often called IP Version 6 (IPv6) or Next Generation Internet Protocol (IPng), is a 128-bit binary number. The standard human readable notation for IPv6 addresses presents the address as eight 16-bit hexadecimal words, each separated by a colon (e.g., 2EDC:BA98:0332:0000:CF8A:000C:2154:7313).

IP addresses, however, even in human readable notation, are difficult for people to remember and use. A Uniform Resource Locator (URL) is much easier to remember and may be used to point to any computer, directory, or file on the Internet. A browser is able to access a website on the Internet through the use of a URL. The URL may include a Hypertext Transfer Protocol (HTTP) request combined with the website's Internet address, also known as the website's domain name. An example of a URL with a HTTP request and domain name is: http://www.companyname.com. In this example, the "http" identifies the URL as a HTTP request and the "companyname.com" is the domain name.

Domain names are much easier to remember and use than their corresponding IP addresses. The Internet Corporation for Assigned Names and Numbers (ICANN) approves some Generic Top-Level Domains (gTLD) and delegates the responsibility to a particular organization (a "registry") for maintaining an authoritative source for the registered domain names within a TLD and their corresponding IP addresses. For certain TLDs (e.g., .biz, .info, .name, and .org) the registry is also the authoritative source for contact information related to the domain name and is referred to as a "thick" registry. For other TLDs (e.g., .com and .net) only the domain name, registrar identification, and name server information is stored within the registry, and a registrar is the authoritative source for the contact information related to the domain name. Such registries are referred to as "thin" registries. Most gTLDs are organized through a central domain name Shared Registration System (SRS) based on their TLD.

The process for registering a domain name with .com, .net, .org, and some other TLDs allows an Internet user to use an ICANN-accredited registrar to register their domain name. For example, if an Internet user, John Doe, wishes to register the domain name "mycompany.com," John Doe may initially determine whether the desired domain name is available by contacting a domain name registrar. The Internet user may make this contact using the registrar's webpage and typing the desired domain name into a field on the registrar's webpage created for this purpose. Upon receiving the request from the Internet user, the registrar may ascertain whether "mycompany.com" has already been registered by checking the SRS database associated with the TLD of the domain name. The results of the search then may be displayed on the webpage to thereby notify the Internet user of the availability of the domain name. If the domain name is available, the Internet user may proceed with the registration process. Otherwise, the Internet user may keep selecting alternative domain names until an available domain name is found. Domain names are typically registered for a period of one to ten years with first rights to continually re-register the domain name.

An individual or entities' domain name is increasingly the anchor around which their online presence is maintained. For example, a company's website (www.companyname.com) and email system (john.doe@companyname.com) utilize the company's domain name as an integral part of their architecture. Similarly, many Internet users use their email address, and therefore their domain name, as a means of identification on social websites, which have proliferated in recent years. Social websites are social networking services that focus on building and verifying online social networks for communities of people who share interests and activities, or who are interested in exploring the interests and activities of others, and which necessitates the use of software. Most social websites are Internet based and provide a collection of various ways for users to interact, such as chat, messaging, email, video, voice chat, file sharing, blogging, discussion groups, etc. The main types of social networking services are those which contain directories of some categories (such as former classmates), means to connect with friends (usually with self-description pages), and/or recommendation systems linked to trust. Popular methods now combine many of these, with MYSPACE, BEBO, FACEBOOK, YOUTUBE, LINKEDIN, and FLICKR being but a few examples.

Such social websites often post their members' public webpages for all Internet users to view, without authentication or login. Conversely, members' private webpages may only be accessed and viewed by the member. Such private webpages generally require member authentication and provide the member with tools to manage his public webpage, communicate with other members, and/or otherwise manage his social website membership.

Many social websites, typically those that receive or share sensitive information (as well as websites associated with banks, credit card companies, and online businesses), may require Internet users to login to the website with a secure username and password before accessing the website's content.

The username/password system is a common form of secret authentication data used to control website access. The username/password is kept secret from those not allowed access. Those wishing to gain access are tested on whether or not they have a valid (recognized) username and whether they know the associated password. Internet users are granted or denied access to websites accordingly.

Many social websites have different rules governing the creation of usernames and passwords. Some require passwords that include a complex combination of letters, numbers, and other characters. Others have no restrictions whatsoever. With the proliferation of login-access websites, Internet users often must remember dozens (or more) different username/password combinations, one for each secure website they wish to access. This has resulted in what has come to be known as "password fatigue."

Partly in response to these issues, the concept of the "digital identity" has evolved. A digital identity is a set of characteristics by which a person or thing is recognizable or distinguished in the digital realm. Digital identity allows for the electronic recognition of an individual or thing without confusing it for someone or something else.

There are many applications for an Internet user's digital identity, including authenticating the user before permitting access to a website. One method for such authentication includes the use of a URL (e.g., OpenID). URL-based digital identity systems (such as OPENID) utilize a framework based on the concept that any individual or entity can identify themselves on the Internet with a URL provided by a Digital Identity Provider (e.g., johndoe.openid.com). The Digital Identity Provider maintains an Identity Server on which a Digital Identity Database (a database of provided digital identity URLs and the corresponding authentication passwords) is stored.

Once obtained, the Internet user may utilize their digital identity URL to access various websites. For example, to login to an OpenID-enabled website, the user enters their OpenID (e.g., johndoe.openid.com) in the username box. The user is then momentarily redirected to the user's Digital Identity Provider's website (or an authentication window appears) to login using whatever password they have set up with their Digital Identity Provider. Once authenticated, the Digital Identity Provider sends the participating website an encrypted message (a token) confirming the identity of the person logging in. There are currently numerous Digital Identity Providers offering URL-based (OpenID) digital identity services, meaning they offer digital identity URLs and servers to authenticate them.

Applicant, however, has noticed that presently-existing systems and methods do not allow Internet users to manage multiple social websites in a simple, unified, and focused fashion. Internet users who join multiple social websites have no single website to which they can go to obtain access to all of their social websites. Similarly, Internet users' friends, family, and/or other social contacts do not have a single website to which they may go to access all of the Internet user's social website's public webpages. For the foregoing reasons, there is a need for the systems and methods for managing multiple social websites and related functionality as described herein.

SUMMARY OF THE INVENTION

The limitations cited above and others are substantially overcome through the systems and methods disclosed herein, which allow for efficient management of multiple social websites.

In an example embodiment, a Personal Portal Website may be hosted on at least one server communicatively coupled to a Network. The Personal Portal Website may resolve from a domain name registered to a Registrant. The Personal Portal Website may comprise means for authenticating the Registrant, which may be accomplished using an OpenID standard. Once properly authenticated, the Registrant may access a Management Webpage having means for selecting a plurality of social websites and means for generating a Social Domain for at least one of the selected social websites. This may be accomplished by concatenating at least one subdomain to the Registrant's domain name and subsequently mapping the Social Domain to a URL for a webpage on one of the Registrant's social websites. Links to one or more social websites may subsequently be displayed on a Portal Webpage. When accessed by a properly-authenticated Registrant, the Portal Webpage may display links to the Registrant's private webpages from the selected social websites. If accessed by a non-authenticated Internet user, the Portal Webpage may display links to the Registrant's public webpages from the selected social websites.

An exemplary system for managing multiple social websites may comprise a Personal Portal Website hosted on a server that may be communicatively coupled to a Network. The Personal Portal Website may resolve from a domain name registered to a Registrant. The Personal Portal Website also may have means for authenticating the Registrant and a Management Webpage, which is accessible only to the Registrant after successful authentication. The Management Webpage may also have means for selecting a plurality of social websites. A Portal Webpage also may be accessible via the Personal Portal Website, and may have links to the social websites selected by the Registrant on the Management Webpage.

Another exemplary system for managing multiple social websites may comprise means for registering a domain name to a Registrant, at least one social website, and a Personal Portal Website communicatively coupled to the registering means and social website(s). The Personal Portal Website also may comprise means for generating a Social Domain (possibly by concatenating at least one subdomain to the Registrant's domain name), means for mapping the Social Domain to a URL for the Registrant's public webpage on his social website(s), and means for displaying the Registrant's public webpage(s) when the Social Domain is entered in a browser.

An exemplary method for managing social websites may comprise the steps of registering a domain name to a Registrant, generating a Social Domain (that corresponds to a social website) by concatenating at least one subdomain to the Registrant's domain name, mapping the Social Domain to a URL for the Registrant's social website webpage, entering the Social Domain in a browser, and displaying the Registrant's social website webpage. In one possible embodiment, the displayed social website webpage may be the Registrant's public webpage. In another possible embodiment, after authenticating the Registrant, identity-related data collected during the domain name registration process may be transferred to a social website. The Registrant may then be logged into the social website and his private webpage from the social website may be displayed.

Another exemplary method of managing multiple social websites may comprise the steps of providing a Personal Portal Website (that may resolve from a domain name registered to a Registrant and may be communicatively coupled to a plurality of social websites), displaying the Registrant's public webpage from at least one social website, and authenticating the Registrant. If the Registrant is successfully authenticated, the Registrant may be logged into at least one social websites and the Registrant's private webpage from the social website(s) may be displayed.

The above features and advantages of the present invention will be better understood from the following detailed description taken in conjunction with the accompanying drawings.

DETAILED DESCRIPTION

Figure 1:
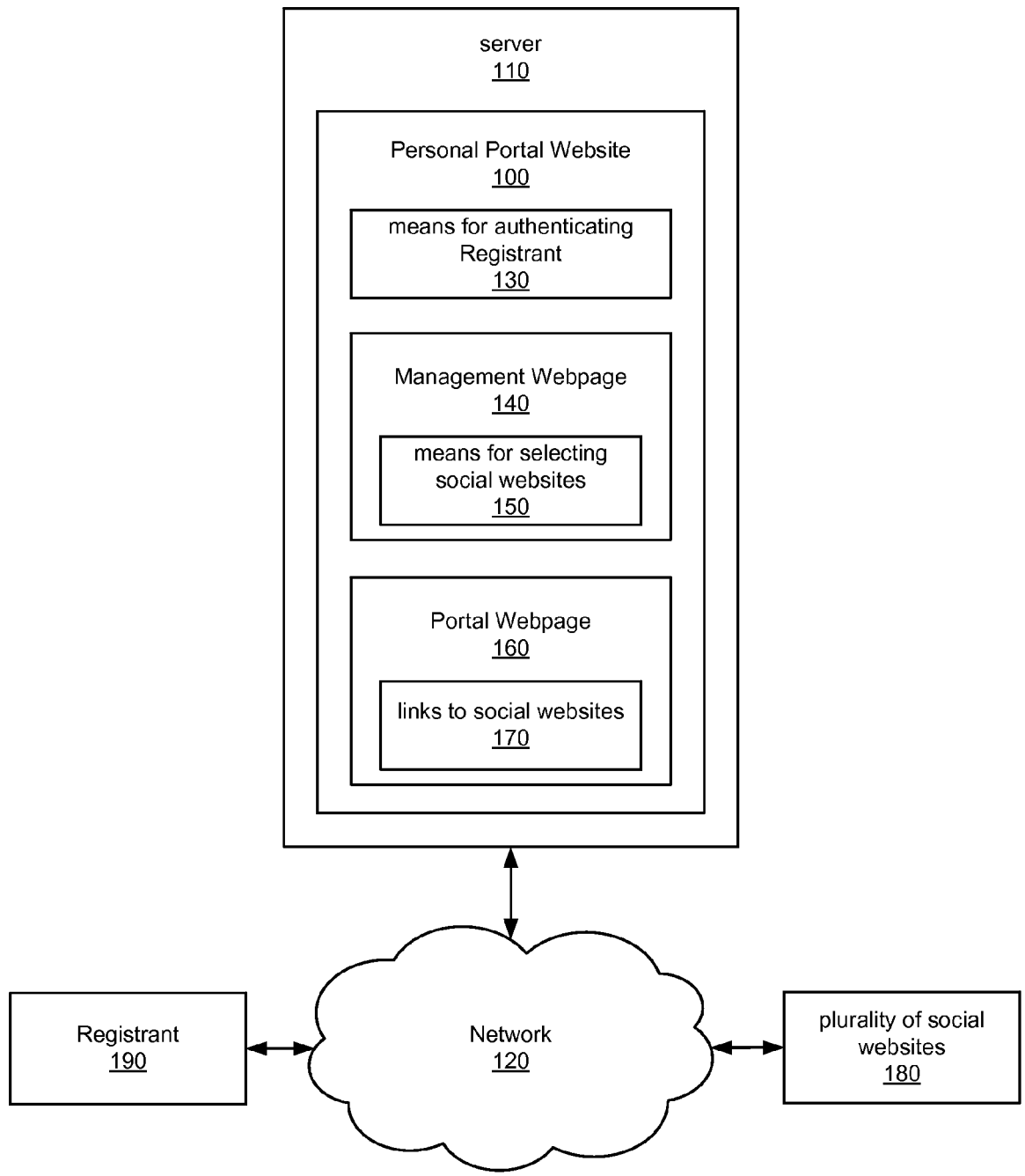
FIG. 1 illustrates a possible embodiment of a system for managing multiple social websites.

The present inventions will now be discussed in detail with regard to the attached drawing figures which were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

A streamlined example embodiment of a system for managing multiple social websites is illustrated in FIG. 1. The illustrated embodiment includes a Personal Portal Website 100 hosted on at least one server 110 communicatively coupled to a Network 120. The Personal Portal Website 100 may resolve from a domain name registered to a Registrant 190 and may have means for authenticating 130 the Registrant 190. The system also may include a Management Webpage 140 on the Personal Portal Website 100 that is accessible to the Registrant 190 only after successful authentication. The Management Webpage 140 also may have means for selecting 150 a plurality of social websites 180. The system also may include a Portal Webpage 160 accessible via the Personal Portal Website 100. The Portal Webpage 160 may have a plurality of links 170 to a plurality of social websites 180.

The Personal Portal Website 100 is a single place on a Network 120 (such as the Internet) where a Registrant 190 may go to access, view, and manage the many social websites 180 that the Registrant 190 may use, or to which he may belong. The Personal Portal Website 100 may be accessed by the Registrant 190 (or any Network 120 user) by entering the website's URL (e.g., domain name) into a browser, which will cause the Personal Portal Website 100 to resolve from the domain name.

The example embodiments herein place no limitation on Network 120 configuration or connectivity. Thus, as non-limiting examples, the Network 120 could comprise the Internet, an intranet, an extranet, a local area network, a wide area network, a wired network, a wireless network, a telephone network, or any combination thereof. The Registrant 190 may be an individual or an entity including, but not limited to, a person, a business, a governmental institution, an educational institution, a non-profit organization, or a social organization.

The Personal Portal Website 100 may be hosted on at least one server 110 by, as a non-limiting example, subscribing to a hosting provider (e.g., GODADDY.COM) for website hosting services (e.g., GODADDY.COM's HOSTING PLANS). Alternatively, the at least one server 110 could be any computer or program that provides services to other computers, programs, or users either in the same computer or over a computer network. As non-limiting examples, the at least one server 110 could be an application, communication, mail, database, proxy, fax, file, media, web, peer-to-peer, or standalone server and may use any server format known in the art or developed in the future (possibly a shared hosting server, a virtual dedicated hosting server, a dedicated hosting server, or any combination thereof).

The Personal Portal Website 100 may be communicatively coupled to a Network 120 via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPPoE), and/or any combination thereof.

The Personal Portal Website 100 also may have means for authenticating 130 the Registrant 190. Authentication is the process of attempting to verify the identity of the sender of a communication, such as a request to log in or access a resource. The thing being authenticated may be a person using a computer (e.g., the Registrant 190), a computer itself, or a computer program. As non-limiting examples, the means for authenticating 130 may utilize any weak or strong authentication system known in the art or developed in the future, such as username/password, challenge/response, OpenID, MICROSOFT CARDSPACE, any Single Sign-On (SSO) methodology, Public Key Infrastructure (PKI), digital signatures, zero-knowledge proofs, Kerberos, smart card, biometrics (retina, voice, fingerprint, or DNA recognition) and/or and combination thereof.

The Personal Portal Website 100 also may comprise a Management Webpage 140, which is accessible only to a Registrant 190 after proper authentication. Unauthenticated network users may be denied access to webpage content. The Management Webpage 140 may comprise means for selecting 150 a plurality of social websites 180 that allows the Registrant 190 to identify any number of social websites 180 that he may use, or to which he may belong. The means for selecting 150 may comprise any method of identifying websites including, but not limited to, data fields in which the Registrant 190 may enter social website 180 identifying information (e.g., URL, website address, or social website name). Alternatively, a list of social websites 180 may be presented from which the Registrant 190 may select.

The Personal Portal Website 100 also may comprise a Portal Webpage 160, which may be accessible to all Network 120 users. This Portal Webpage 160 may display the Registrant's 190 public webpages from one or all of his social websites 180. This provides the Registrant's 190 friends or family a single online location at which they may access and view all of the Registrant's 190 social websites 180. The Portal Webpage 160 may have a plurality of links 170 to the social websites 180 selected by the Registrant 190 on the Management Webpage 140. The links 170 may comprise any method of linking, displaying, or redirecting a Network 120 user to the Registrant's 190 social websites 180.

Figure 2:
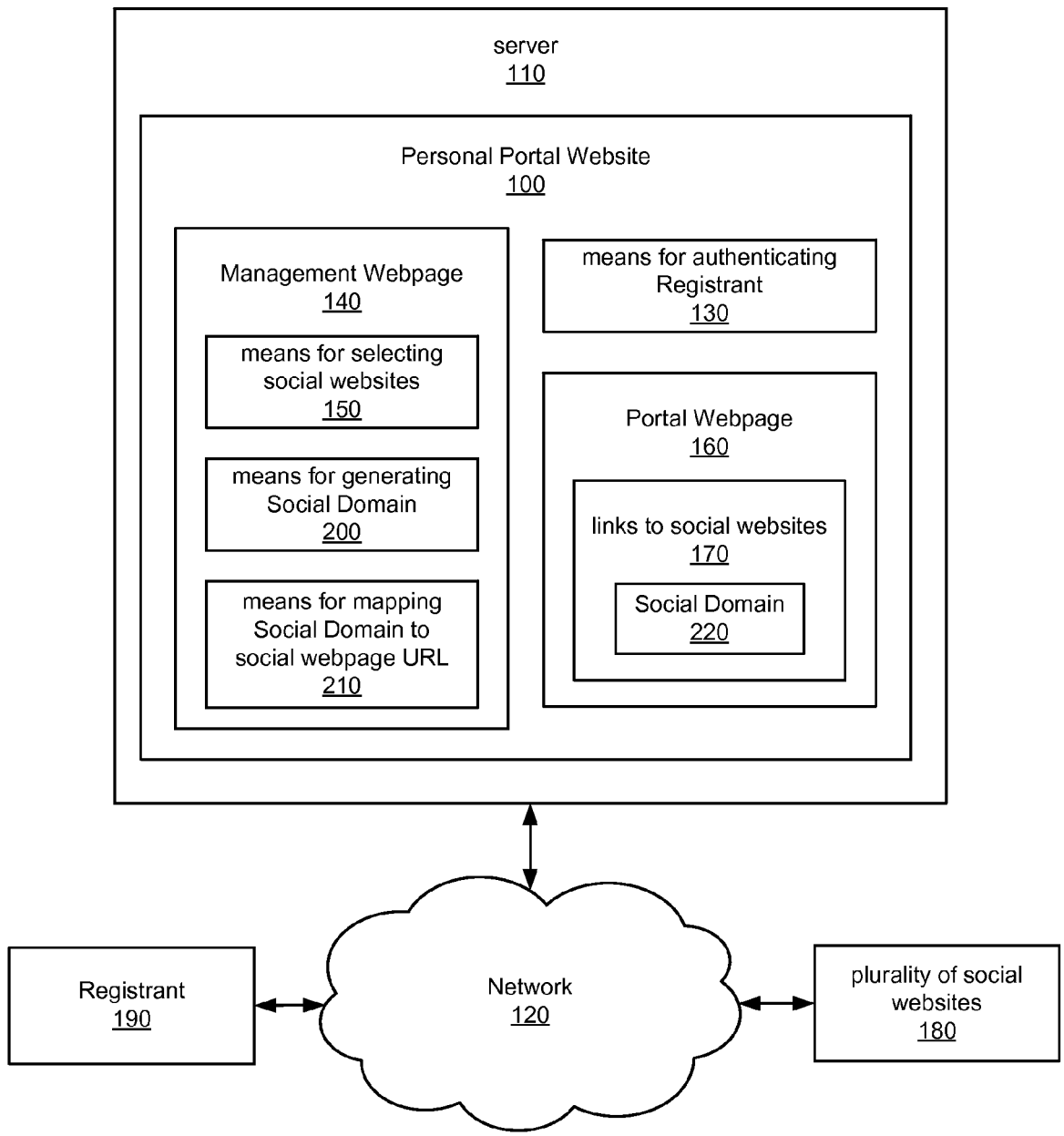
FIG. 2 illustrates a possible embodiment of a system for managing multiple social websites.

In alternate embodiment of a system for managing multiple social websites, illustrated in FIG. 2, the Management Webpage 140 also may comprise means for generating 200 a Social Domain 220. The Social Domain 220 may comprise at least one subdomain concatenated to a domain name. Only a properly-authenticated Registrant 190 will be provided access to the functionality on the Management Webpage 140. The means for generating 200 a Social Domain 220 may comprise web and/or client-based software tool allowing the properly-authenticated Registrant 190 to generate at least one Social Domain 220, each of which may be tied to his domain name.

For example, if a Registrant 190 registers the domain name, "johndoe.com," he may then concatenate a subdomain (e.g., "myspace") to "johndoe.com" to generate a Social Domain 220 such as "myspacejohndoe.com." Using the social website 180 examples discussed above (i.e., BEBO, FACEBOOK, YOUTUBE, LINKEDIN, and FLICKR), the Registrant 190 also may generate additional Social Domains 220, such as "bebojohndoe.com," "facebookjohndoe.com," youtubejohndoe.com," "linkedinjohndoe.com," and "flickrjohndoe.com." In this example embodiment, the subdomain need not necessarily have the same name as the social website 180. Any subdomain may be used, perhaps one that simply refers to the social website's 180 subject matter, (e.g., "photosjohndoe.com" or "blogjohndoe.com").

In one example embodiment, the means for generating 200 a Social Domain 220 comprises data entry fields in which the Registrant 190 may enter subdomains and the domain name (s) for concatenation. It may also contain a data field in which the Registrant 190 may enter a URL for a social website 180 related to the Social Domain 220 (e.g., www.myspace.com). Alternatively, the Registrant 190 may select domain names, subdomains, and/or social website 180 URLs from a list, perhaps in drop-down menu or matrix form. In yet another embodiment, the means for generating 200 may use a software-implemented algorithm to generate suggested Social Domains 220.

In the embodiment illustrated in FIG. 2, the Management Webpage 140 also may comprise means for mapping 210 a generated Social Domain 220 to a URL for a webpage on at least one of the social websites 180. This mapping means 210 may be a client or server-based software tool that may perform the mapping function automatically based on domain name, subdomain, and social website 180 URL information previously provided by the Registrant 190. Alternatively, the means for mapping 210 may provide the Registrant 190 with the ability (e.g., data fields, lists, drop-down menu, matrix, etc.) to manually map his Social Domain 220 to social website 180 URLs. The means for mapping 210 may use any method and/or technology known in the art or developed in the future for mapping a Social Domain 220 to another URL including, but not limited to URL forwarding, redirecting, masking and/or any combination thereof.

URL redirection (also called URL forwarding) is a technique for making a web page available under many URLs. URL masking comprises hiding the social website's 180 domain name from the URL field of a user's browser in favor of the Social Domain 220. As is known in the art, this may be accomplished by manual redirection, using HTTP 3xx status codes, server-side redirection scripting, .htaccess files, meta refresh redirection, JavaScript redirects, frame redirects, and/or redirect loops. Alternatively, masking can be accomplished by using an HTML inline frame or frameset so a frame embedded in the social website 180 points to another site. Aliases also may be implemented to have the web server serve the same page for two different domain names.

In this example embodiment, at least one of the plurality of links 170 to social websites 180 comprises a link to a Social Domain 220. Thus, the Social Domain 220 generated by (or for) the Registrant 190 may be used to direct Network 120 users to the social websites 180 selected by the Registrant 190. The Portal Webpage 160, which may be accessed by any Network 120 user, may therefore publish a complete list of the Registrant's 190 social websites 180 by their corresponding Social Domains 220. Accordingly, the Registrant's 190 friends or family (or any Network 120 user) may go to the Portal Webpage 160 on the Registrant's 190 Personal Portal Website 100 to view and access all of the Registrant's 190 social websites 180 by their corresponding Social Domains 220.

Figure 3:
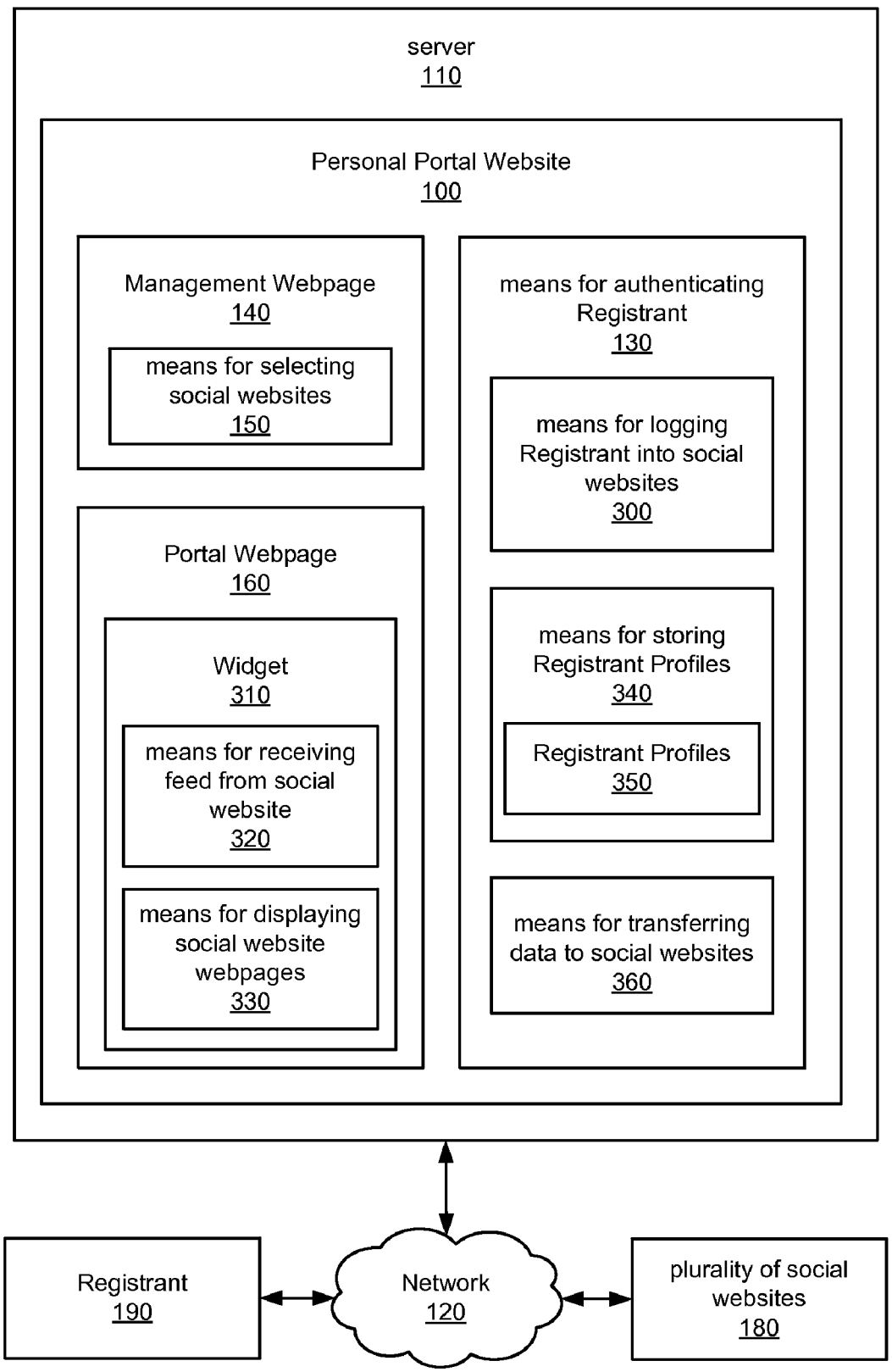
FIG. 3 illustrates a possible embodiment of a system for managing multiple social websites.

In alternate embodiment of a system for managing multiple social websites, illustrated in FIG. 3, the means for authenticating 130 the Registrant 190 further comprises means for logging in 300 to at least one of the Registrant's 190 social websites 180. The means for logging in 300 has the ability to, once the Registrant 190 is authenticated, log him into at least one of the social websites 180. The means for logging in 300 may utilize a means for transferring data 360, which itself may be a component of the means for authenticating 130 the Registrant 190.

The means for transferring data 360 may utilize any method of transferring data known in the art or developed in the future. Such methods can generally be classified in two categories: (1) "pull-based" data transfers where the receiver initiates a data transmission request; and (2) "push-based" data transfers where the sender initiates a data transmission request. Both types are expressly included in the embodiments illustrated herein, which also may include transparent data transfers over network file systems, explicit file transfers from dedicated file-transfer services like FTP or HTTP, distributed file transfers over peer-to-peer networks, file transfers over instant messaging systems, file transfers between computers and peripheral devices, and/or file transfers over direct modem or serial (null modem) links, such as XMO-DEM, YMODEM and ZMODEM. Data streaming technology also may be used to effectuate data transfer. A data stream may be, for example, a sequence of digitally encoded coherent signals (packets of data) used to transmit or receive information that is in transmission. Any data transfer protocol known in the art or developed in the future may be used including, but not limited to: (1) those used with TCP/IP (e.g., FTAM, FTP, HTTP, RCP, SFTP, SCP, or FASTCopy); (2) those used with UDP (e.g., TFTP, FSP, UFTP, or MFTP); (3) those used with direct modem connections; (4) HTTP streaming; (5) Tubular Data Stream Protocol (TDSP); (6) Stream Control Transmission Protocol (SCTP); and/or (7) Real Time Streaming Protocol (RTSP).

The transferred data may vary, depending upon the login requirements of the social website 180, but could comprise identity-related data, such as a username/password, Digital Identity, an OpenID, metadata, microformats, contact information, relationship information, domain name registration information, WHOIS data relating to a domain name, and/or any combination thereof, or any other data necessary to log the Registrant 190 into the social website 180. Metadata is data about data. An item of metadata may describe an individual datum, or content item, or a collection of data including multiple content items. A microformat is a web-based data formatting approach that seeks to re-use existing content as metadata, perhaps using XHTML and HTML classes and attributes. This approach allows information intended for end-users (e.g., contact information, geographic coordinates, calendar events, etc.) to also be automatically processed by software. The identity-related data may have been collected at any time from the Registrant 190, perhaps during a domain name registration.

Social websites 180 often allow users to create a profile for themselves. These profiles may include any of the above-described identity-related data, as well as photographs, contact information, favorites (e.g., favorite social website 180 users, music, movies, etc.), age, gender, contact information, and/or any combination thereof. In the instant embodiment, the Registrant 190 may generate and store any number of Registrant Profiles 350 that, upon successful authentication, may be shared with a social website 180 via the means for transferring data 360. The means for transferring data 360 may transfer at least one Registrant Profile 350 to a social website 180. Alternatively, it may transfer identity-related data.

Identity-related data may be stored individually, or perhaps in the form of Registrant Profiles 350 in a means for storing 340 Registrant Profiles 350, which may be a component of the means for authenticating 130. Structurally, the means for storing 340 may comprise any storage device for storing data. As non-limiting examples, the means for storing 340 may comprise a magnetic storage device, disk drive, FLASH or RAM memory, local database, online database, desktop database, server-side database, relational database, hierarchical database, network database, object database, object-relational database, associative database, concept-oriented database, entity-attribute-value database, multi-dimensional database, semi-structured database, star schema database, XML database, file, collection of files, spreadsheet, and/or other means of data storage located on at least one server 110, a computer, a client, another server, or any other storage device.

In the embodiment illustrated in FIG. 3, the Portal Webpage's 160 links to social websites 180 may each appear as a Widget 310, which may have means for receiving 320 a feed from at least one of said plurality of social websites 180. A Widget 310 is a host software system for running and displaying desktop tools on the desktop that may give access to information and frequently used functions such as feeds, clocks, calendars, news aggregators, etc. A "feed" is a data format (perhaps XML-based) used for providing users with frequently-updated content. Two common feed formats that may be used with the present invention are RSS and Atom. The means for receiving 320 a feed from at least one of said plurality of social websites 180 may comprise any of the widely-available (client or server-side) feed readers/aggregators required to receive and read feeds from the social websites 180 including, but not limited to, FEEDREADER CONNECT, FEEDREADER OEM, ATTENSA FEED READERS. Alternatively, the means for receiving 320 may comprise proprietary software solutions.

The Widget 310 also may comprise means for displaying 330 webpages from social websites 180 providing feeds. The means for displaying 330 may comprise the feed readers/aggregators discussed above, but having the ability to differentiate between authenticated and non-authenticated Network 120 users. Once the Registrant 190 is authenticated and logged into a social website 180, the means for displaying 330 displays the Registrant's 190 private webpage, perhaps in the Widget 310 on the Portal Webpage 160. If the Portal Webpage 160 is accessed by a non-authenticated Network 120 user, the means for displaying 330 may display the Registrant's 190 public webpage from the social website 180. Accordingly, the Portal Webpage 160 comprises means for providing the Registrant 190 with authenticated access to his social websites 180, as well as means for providing non-authenticated Internet users with access to the Registrant's 190 public webpages.

Figure 4:
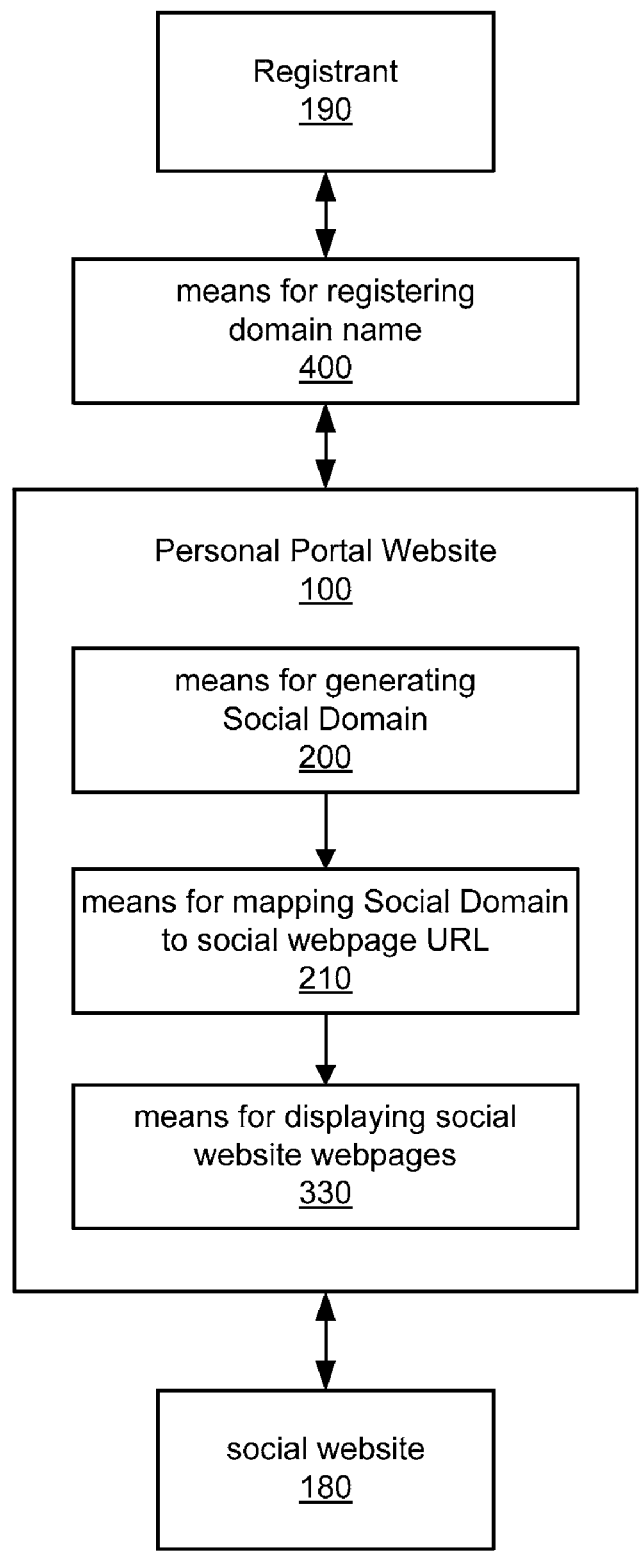
FIG. 4 illustrates a possible embodiment of a system for managing multiple social websites.

Another streamlined example embodiment of a system for managing multiple social websites is illustrated in FIG. 4. The illustrated embodiment includes means for registering 400 a domain name to a Registrant 190, at least one social website 180, and a Personal Portal Website 100, each being communicatively coupled to each other via any method of connection known in the art or developed in the future including, but not limited to wired, the Internet, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPPoE), and/or any combination thereof.

The means for registering 400 a domain name may comprise any domain name registration system known in the art or developed in the future including, but not limited to domain name registration services offered by domain name registries, registrars, and/or resellers (e.g., GODADDY.COM). The process for registering a domain name with .com, .net, .org, and some other TLDs allows an Internet user to use an ICANN-accredited registrar to register their domain name. For example, if an Internet user, John Doe, wishes to register the domain name "mycompany.com," John Doe may initially determine whether the desired domain name is available by contacting a domain name registrar. The Internet user may make this contact using the registrar's webpage and typing the desired domain name into a field on the registrar's webpage created for this purpose. Upon receiving the request from the Internet user, the registrar may ascertain whether "mycompany.com" has already been registered by checking the SRS database associated with the TLD of the domain name. The results of the search then may be displayed on the webpage to thereby notify the Internet user of the availability of the domain name. If the domain name is available, the Internet user may proceed with the registration process. Otherwise, the Internet user may keep selecting alternative domain names until an available domain name is found.

The Personal Portal Website 100 may further comprise means for generating 200 a Social Domain 220 by concatenating at least one subdomain to said domain name, means for mapping 210 said Social Domain 220 to a URL for said Registrant's 190 public webpage on said at least one social website 180, and means for displaying 330 said Registrant's 190 public webpage from said at least one social website 180 when said Social Domain 220 is entered in a browser. Each of these means, which are described in detail above, may be implemented by either client or server-side software.

Figure 5:
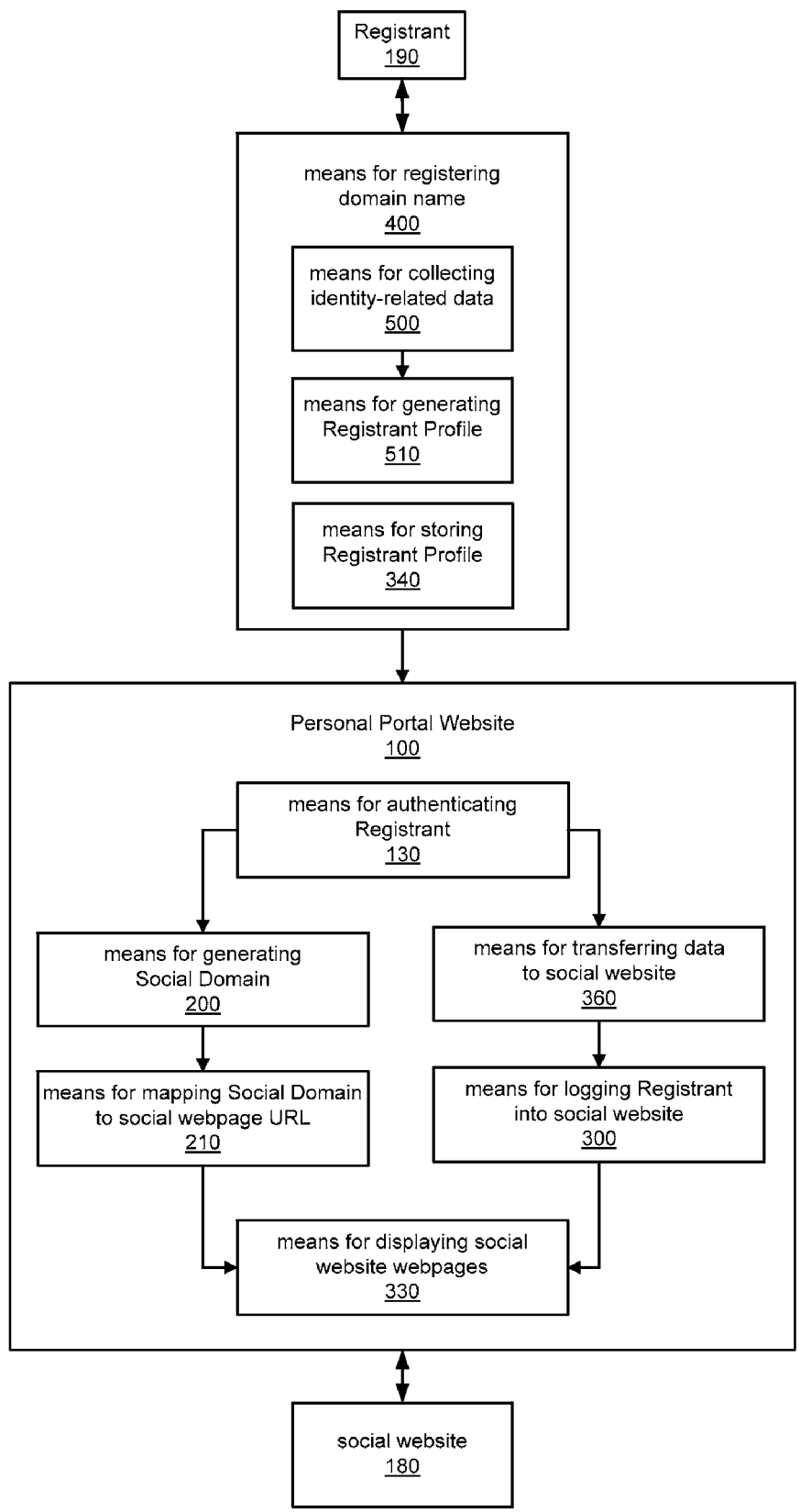
FIG. 5 illustrates a possible embodiment of a system for managing multiple social websites.

A more detailed example embodiment of a system for managing multiple social websites is illustrated in FIG. 5. In addition to the elements illustrated in FIG. 4, the registering means 400 of the instant embodiment further comprises means for collecting 500 at least one identity-related data from said Registrant 190. The data collecting means 500 could comprise any method of receiving identity-related data from the Registrant 190. In a preferred embodiment, such data may be obtained via the domain name registration process, perhaps by requesting the Registrant 190 to provide identity-related data on a website, over the telephone, or via email. The identity-related data could comprise any data related to the Registrant's 190 identity, such as a username/password, a Digital Identity, an OpenID, a plurality of metadata, a plurality of microformats, a plurality of contact information, a plurality of relationship information, a plurality of domain name registration information, a plurality of WHOIS data relating to said domain name, and/or any combination thereof.

In this example embodiment, the registering means 400 also may comprise means for generating 510 a Registrant Profile 350 from the identity-related data. The Registrant Profile 350 may be similar to profiles that social websites 180 often allow users to create for themselves. These profiles may include any of the above-described identity-related data, as well as photographs, contact information, favorites (e.g., favorite social website 180 users, music, movies, etc.), age, gender, contact information, and/or any combination thereof. In the instant embodiment, the means for generating 510 and means for storing 340 a Registrant Profile 350 allow the Registrant 190 to generate and store any number of Registrant Profiles 350. The generating means 510 may automatically generate a Registrant Profile 350 by extracting relevant identity-related data and populating a template and/or form. Alternatively, the Registrant 190 may be provided with a template and/or form, perhaps on a website, to manually generate a Registrant Profile 350.

The Personal Portal Website 100 also may comprise means for authenticating 130 the Registrant 190, perhaps by verifying the Registrant 190 using an OpenID standard. URL-based digital identity systems, such as OpenID, utilize a framework based on the concept that any individual or entity can identify themselves on the Internet with a URL (e.g., johndoe.openid.com) provided by a trusted third party (e.g., a Digital Identity Provider). The Digital Identity Provider may maintain an Identity Server on which a Digital Identity Database (a database of provided digital identity URLs and the corresponding authentication passwords) is stored. Once obtained, the Internet user may utilize their digital identity URL to access various websites. For example, to login to an OpenID-enabled Personal Portal Website 100, the Registrant 190 may enter his digital identity URL in a username box, or other data field. The Registrant 190 may then be momentarily redirected to the Registrant's 190 Digital Identity Provider's website (or an authentication window appears) to login using whatever password they have set up with their Digital Identity Provider. Once authenticated, the Digital Identity Provider may sends the Personal Portal Website 100 an encrypted message (a token) confirming the identity of the Registrant 190 logging in.

The Personal Portal Website 100 also may comprise means for logging in 300 said Registrant 190 to a social website 180 after successful authentication and means for displaying 330 the Registrant's 190 private webpage from the social website 180 after successful authentication. The displaying means may employ links to webpages or Social Domains 220, widgets, feeds, and/or any other webpage display technology known in the art or developed in the future. The Personal Portal Website 100 also may comprise means for transferring data 360 to the social website 180 after successful authentication. The data transferred may comprise identity-related data, Registrant Profiles 350, and/or any combination thereof.

The functionality described herein provides the authenticated Registrant 190 with access to his private webpages for all of his social websites 180 on a single, access-protected webpage. It also provides the Registrant 190 with a single webpage on which he may generate Registrant Profiles 350 that may be downloaded to all of his social websites 180, which may use the Registrant Profiles 350 to generate profiles on that specific social website 180. This eliminates the need for the Registrant 190 to individually log into each of his social websites 180 and generate (or update) profiles on each website.

Figure 6:
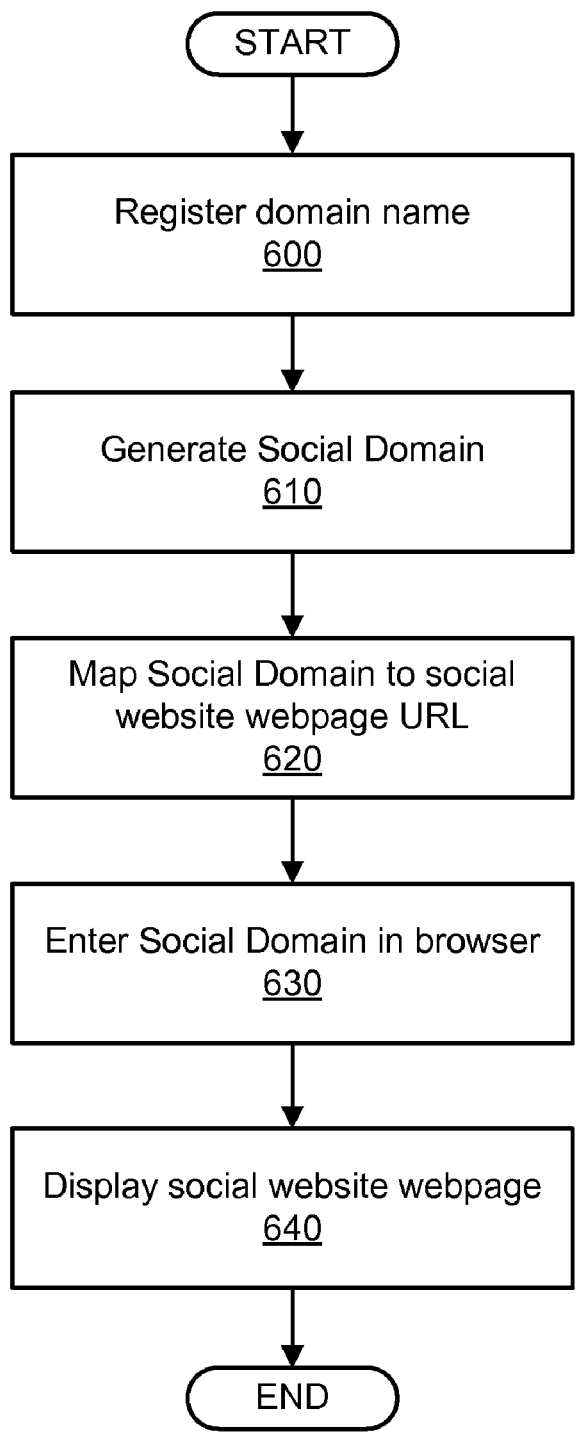
FIG. 6 is a flow diagram illustrating a possible embodiment of a method for managing multiple social websites.

Several different methods may be used for managing multiple social websites. In the streamlined example embodiment illustrated in FIG. 6, a domain name is registered to a Registrant 190 (Step 600). This registering step may be accomplished by any method of registering a domain known in the art or that may be developed in the future including, but not limited to, those discussed in detail elsewhere in this application.

A Social Domain 220 is then generated by concatenating at least one subdomain to the domain name, with the Social Domain 220 corresponding (i.e., relating in some manner) to a social website 180 (Step 610). For example, if a Registrant 190 registers the domain name, "johndoe.com," he may then concatenate a subdomain (e.g., "myspace") to "johndoe.com" to generate a Social Domain 220 such as "myspacejohndoe.com." Using the social website 180 examples discussed above (i.e., BEBO, FACEBOOK, YOUTUBE, LINKEDIN, and FLICKR), the Registrant 190 also may generate additional Social Domains 220, such as "bebo johndoe.com," "facebookjohndoe.com," youtube johndoe.com," "linkedinjohndoe.com," and/or "flickrjohndoe.com." In this example embodiment, the subdomain need not necessarily have the same name as the social website 180. Any subdomain may be used, perhaps simply referring to the social website's 180 subject matter (e.g., "photosjohndoe.com" or "blogjohndoe.com"). This step may be accomplished my any means of concatenating a subdomain to a domain name including, but not limited to, those discussed in detail above.

The Social Domain 220 is then mapped to a URL for a social website 180 webpage for the Registrant 190 (Step 620). As non-limiting examples, this step may be accomplished by the URL forwarding, redirecting, and/or masking techniques discussed in detail elsewhere in this application. For example, the Social Domain 220 "myspacejohndoe.com" may be mapped to a URL for one of John Doe's webpages on www-.myspace.com. In alternate embodiments, the social website 180 webpage may comprise either the Registrant's 190 public or private webpage. As seen below, this provides for systems that publish both private and/or public social website 180 webpages.

The Social Domain 220 is then entered in a browser (Step 630) and the social website 180 webpage is displayed (Step 640). Step 630 may be accomplished automatically (e.g., by software, perhaps on a Personal Portal Website 100) or manually (e.g., by a Network 120 user typing the Social Domain 220 into a browser's address bar). Displaying the social website 180 webpage (Step 640) may be accomplished by any method known in the art or that may be developed in the future of displaying a webpage including, but not limited to, display on a client (e.g., computer, laptop, telephone, handheld device, etc.) display screen, perhaps using the Widget/feed technology discussed in detail elsewhere in this application.

Figure 7:
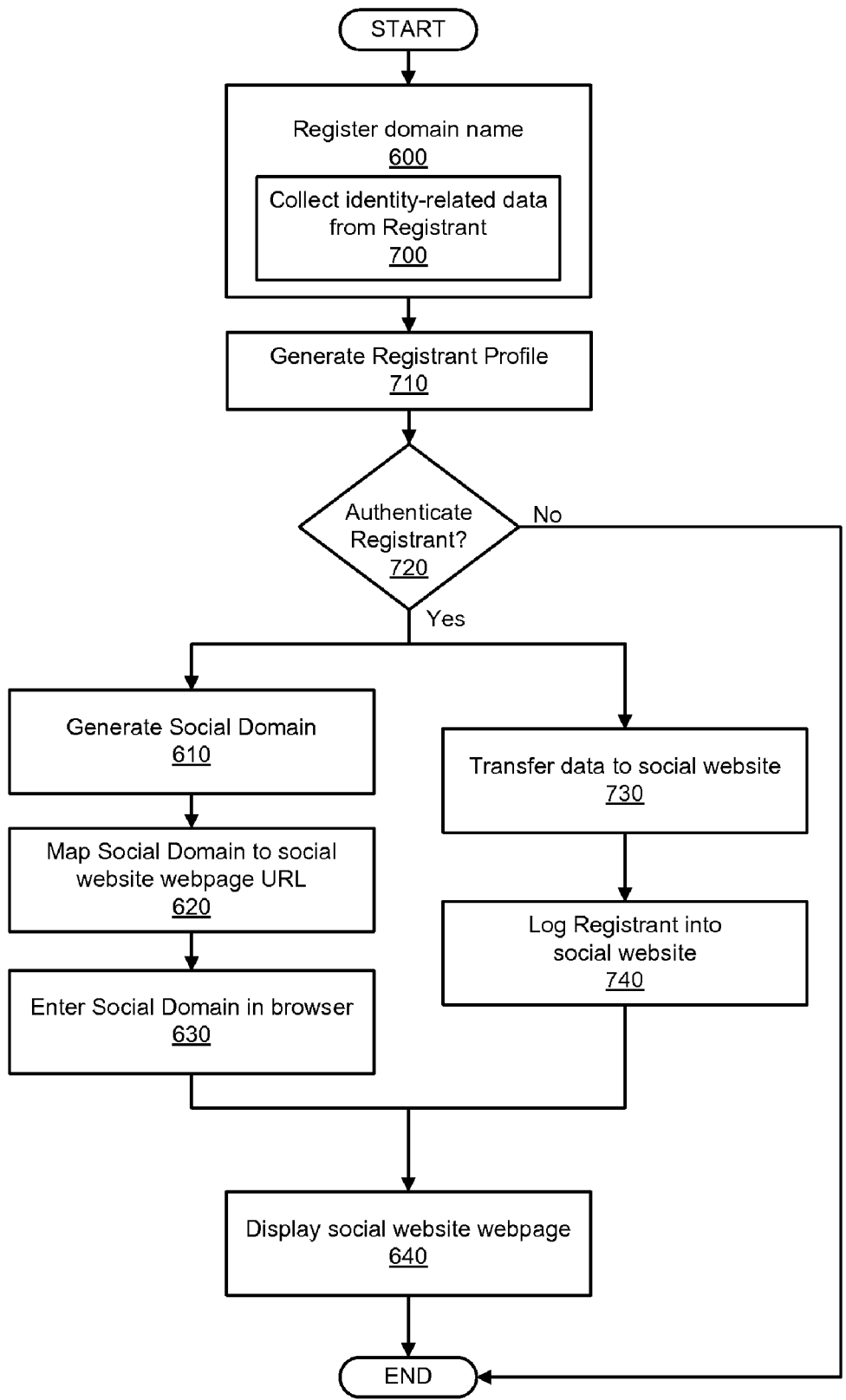
FIG. 7 is a flow diagram illustrating a possible embodiment of a method for managing multiple social websites.

A more detailed for method for managing multiple social websites is illustrated in FIG. 7. In addition to the steps illustrated in FIG. 6, this example embodiment may include the step of, during domain name registration (Step 600), collecting at least one identity-related data from the Registrant 190 (Step 700). The identity-related data may comprise a username/password, Digital Identity, OpenID, plurality of metadata, plurality of microformats, plurality of contact information, plurality of relationship information, plurality of domain name registration information, plurality of WHOIS data relating to said domain name, and/or any combination thereof. At least one Registrant Profile 350 may then be generated from the identity-related data (Step 710). These profiles may include any of the above-described identity-related data, as well as photographs, contact information, favorites (e.g., favorite social website 180 users, music, movies, etc.), age, gender, contact information, and/or any combination thereof.

The Registrant 190 may then be authenticated (Step 720), perhaps via the means for authenticating 130 described in detail above including, but not limited to, the use of the OpenID standard. If the Registrant 190 cannot be authenticated, the method may end. Upon successful authentication, at least one piece of data (possibly identity-related data and/or Registrant Profiles 350) may be transferred to the social website 180 (Step 730), perhaps via the means for transferring data 360 discussed in detail above. The transferred data, for example, also may comprise the Registrant's 190 username/password, OpenID, or other data that may allow the Registrant 190 to be authenticated to and logged into the social website 180 (Step 740), perhaps utilizing the means for logging in 300 described in detail above. FIG. 7 illustrates Steps 610, 620, and 680 being executed in parallel to steps 730 and 740. In alternate embodiments, these steps may be performed in sequence.

Figure 8:
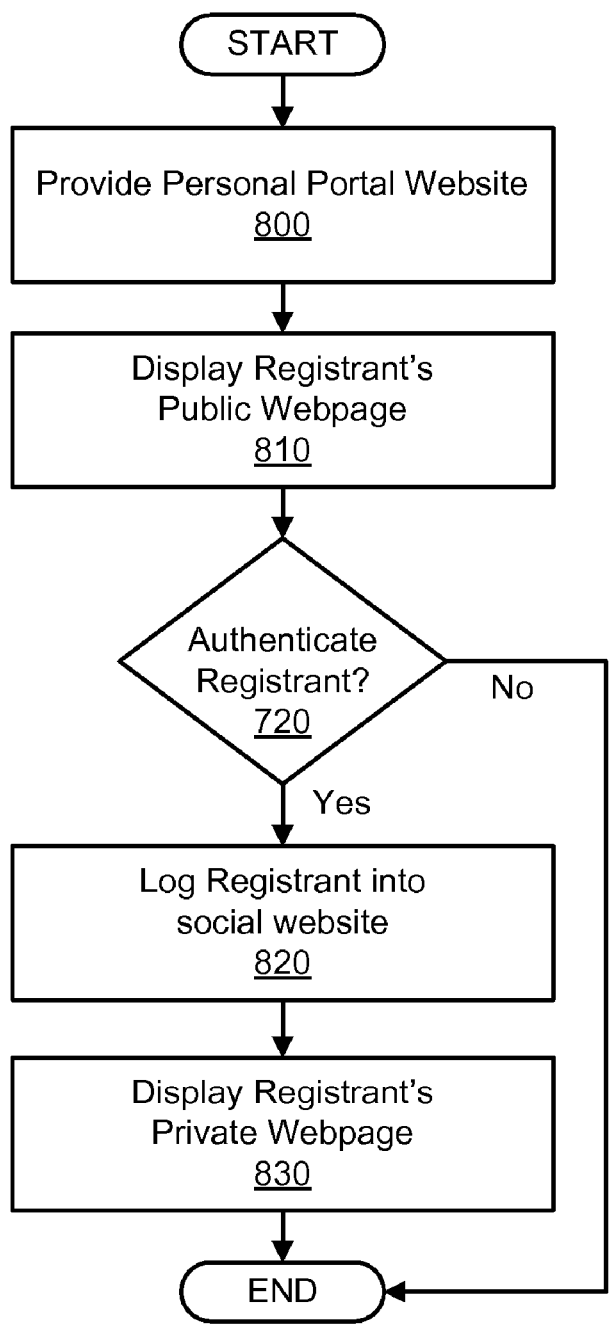
FIG. 8 is a flow diagram illustrating a possible embodiment of a method for managing multiple social websites.

Another embodiment of a method for managing multiple websites is illustrated in FIG. 8. In this embodiment, a Personal Portal Website 100 is provided (Step 800), perhaps by hosting the website on a server. Alternatively, any method of providing a website known in the art or developed in the future may be used including, but not limited to those discussed in detail elsewhere in this application. The Personal Portal Website 100 may resolve from a domain name registered to a Registrant 190 and is communicatively coupled (perhaps using the methods discussed elsewhere in this application) to a plurality of social websites 180.

Next, the Registrant's 190 public webpage from at least one of said plurality of social websites 180 is displayed on the Personal Portal Website 100 (Step 810). The Registrant 190 is then authenticated via the Personal Portal Website 100 (Step 720) perhaps via the means for authenticating 130 described in detail above including, but not limited to, the use of the OpenID standard. If the Registrant 190 cannot be authenticated, the method may end. Upon successful authentication, the Registrant 190 is logged into at least one social website 180 (Step 820), perhaps with the means for logging in 300 and/or means for transferring data 360 discussed in detail above. The Registrant's 190 private webpage from the social website 180 may then be displayed (Step 830). Among other methods, the displaying step (Step 830) could be executed with the above-described means for displaying 330 social website 180 webpages, which may employ links to webpages or Social Domains 220, widgets, aggregators, feeds, and/or any other webpage display technology known in the art or developed in the future.

Figure 9:
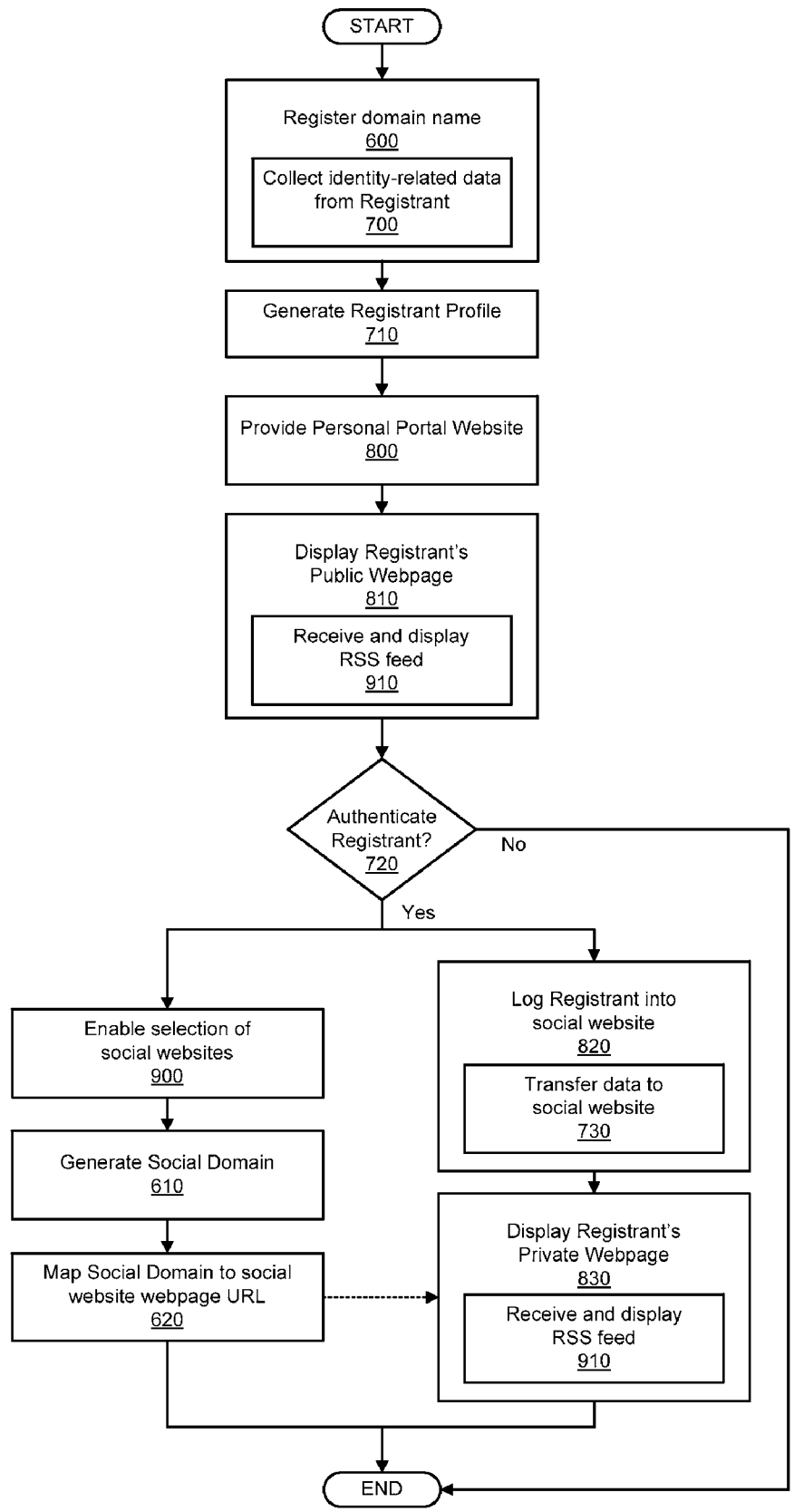
FIG. 9 is a flow diagram illustrating a possible embodiment of a method for managing multiple social websites.

A more detailed method for managing multiple social websites is illustrated in FIG. 9. In addition to the steps illustrated in FIG. 8, this example embodiment may include the step of registering the domain name to the Registrant 190 (Step 600), which itself may further comprise the step of collecting identity-related data from the Registrant 190 (Step 700), perhaps during the registration process. At least one Registrant Profile 350 may then be generated (Step 710), perhaps from the identity-related data, which may comprise a username/password, a Digital Identity, an OpenID, a plurality of metadata, a plurality of microformats, a plurality of contact information, a plurality of relationship information, a plurality of domain name registration information, a plurality of WHOIS data relating to said domain name, and/or any combination thereof.

After successful authentication, the Registrant 190 may be enabled to identify at least one social website 180 for display (Step 900). As a non-limiting example, this may be accomplished by providing the Registrant 190 with a field on a webpage, perhaps on the Personal Portal Website 100, to enter the URL for at least one social website 180. Alternatively, the means for selecting 150 a plurality of social websites 180 may be implemented, which allows the Registrant 190 to identify any number of social websites 180 that he may use, or to which he may belong. The means for selecting 150 may comprise any method of identifying websites including, but not limited to, data fields in which the Registrant 190 may enter social website 180 identifying information (e.g., URL, website address, or social website name). Alternatively, a list of social websites 180 may be presented from which the Registrant 190 may select.

Once the Registrant's 190 social websites 180 are identified, a Social Domain 220 may be generated (Step 610) for each social website 190 selected, perhaps by concatenating at least one subdomain to the Registrant's 190 domain name. The Social Domain 220 may then be mapped (Step 620) to a URL for the Registrant's 190 social website 180 webpage. After the Registrant 190 is logged into the social website 180 (Step 820) that, in this embodiment, may be accomplished by transferring data (e.g., identity-related data, username/password, Registrant Profiles 350, etc.) to the social website 180 (Step 730), the Registrant's 190 private webpage may be displayed (Step 830). In this illustrated embodiment, the webpage displaying steps (Steps 810 and 830) also may comprise receiving and displaying RSS feeds (Step 910), which may be accomplished via, among other methods, the Widget, feed, feed reader, and/or aggregator technology described in detail elsewhere in this application.

In another example embodiment of the present invention, a Registrant 190 (e.g., John Doe) may register a domain name (e.g., johndoe.com) (Step 600), perhaps by going to the website of a domain name registrar, such as www.godaddy.com, and following the instructions. Alternatively, the means for registering 400 a domain name, described in further detail above, may be used. During the domain name registration process, the domain name registrar may collect identity-related data from the Registrant 190 (Step 700). This data could comprise any data collected during the domain name registration process including, but not limited to, a username/password, Digital Identity, OpenID, metadata, microformats, contact information, relationship information, domain name registration information, WHOIS data relating to a domain name, and/or any combination thereof.

The domain name registrar may then generate a Registrant Profile 350 (Step 710) from the identity-related data, perhaps using the means for generating 510 a Registrant Profile 350 described in detail above. By way of example, the Registrant Profile 350 could include the Registrant's 190 OpenID (e.g., johndoe.openid.com), his photo, age, gender, and a list of his favorite restaurants. The Registrant 190, wanting to manage his many social websites 180 in one place, may then access a Personal Portal Website 100, which may have a Management Webpage 140 and a Portal Webpage 160. On the Management Webpage 140, the Registrant 190 may identify the social websites 180 that he uses most often, perhaps www.myspace.com, www.bebo.com, www.facebook.com, www.youtube.com, www.linkedin.com, and www.flickr.com.

The Personal Portal Website 100, or perhaps the Management Webpage 140, may then generate a Social Domain 220 (Step 610) for the selected social websites 180, perhaps by concatenating a subdomain relating to each social website 180 to the Registrant's 190 domain name. Thus, the following Social Domains 220 may be generated: "myspacejohndoe.com," "bebojohndoe.com.," "facebookjohndoe.com," "youtubejohndoe.com," "linkedinjohndoe.com," and "flickrjohndoe.com." Next, each of the Social Domains 220 may be mapped to the URL for the Registrant's 190 public and private webpages for each social website 180 (Step 620), perhaps using URL forwarding, redirecting, masking and/or any combination thereof.

The Portal Webpage 160 may then display a list of the Registrant's 190 Social Domains 220 that function as links 170 to his public webpages (Step 640). Thus, the Registrant's 190 family and friends have a single place on the Internet to which they may go to access all of the Registrant's 190 public social website 180 webpages.

If, however, the Registrant 190 is authenticated (Step 720) by the Personal Portal Website 100, the Portal Webpage 160 may log the Registrant 190 into each social website 180 (Step 740) and display links 170 to his private webpages (Step 830). This may be accomplished by transferring data, identity-related data, and/or Registrant Profiles 350 to each social website 180, perhaps via the means for transferring data 360 discussed in detail above. The functionality described herein provides the authenticated Registrant 190 with access to his private webpages for all of his social websites 180 on a single, access-protected webpage.

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A system for managing social websites, comprising:
    a) means for registering a domain name to a Registrant;
    b) a plurality of social websites hosted on at least one server computer communicatively coupled to a Network, at least one of said plurality of social websites having a public webpage for said Registrant; and
    c) a Personal Portal Website accessible to said Registrant via said Network and providing said Registrant a single website to access, view, and manage a plurality of social websites, said Personal Portal Website being hosted on at least one of said at least one server computer communicatively coupled to said Network and said means for registering, and further comprising:
        i) means for generating a Social Domain by concatenating at least one subdomain to said domain name;
        ii) means for mapping said Social Domain to a URL for said public webpage for said Registrant; and
        iii) means for displaying said public webpage for said Registrant when said Social Domain is entered in a browser.

2. The system of claim 1, wherein said registering means a) further comprises means for collecting at least one identity-related data from said Registrant.

3. The system of claim 2, wherein said identity-related data comprises a Digital Identity, an OpenID, a plurality of metadata, a plurality of microformats, a plurality of contact information, a plurality of relationship information, a plurality of domain name registration information, a plurality of WHOIS data relating to said domain name, and/or any combination thereof.

4. The system of claim 3, wherein said registering means a) further comprises means for generating at least one Registrant Profile from said at least one identity-related data.

5. The system of claim 4, wherein said Personal Portal Website further comprises means for authenticating said Registrant.

6. The system of claim 5, wherein said means for authenticating verifies said Registrant using an OpenID standard.

7. The system of claim 5, wherein said Personal Portal Website further comprises means for logging said Registrant into at least one of said plurality of social websites after said Registrant is authenticated.

8. The system of claim 7, wherein said Personal Portal Website further comprises means for displaying said Registrant's private webpage from said social website after said Registrant is authenticated.

9. The system of claim 8, wherein said Personal Portal Website further comprises means for transferring at least one data to at least one of said plurality of social websites.

10. The system of claim 9, wherein said at least one data comprises at least one of said identity-related data, at least one Registrant Profiles, and/or any combination thereof.

11. A system for managing social websites, comprising:
   a) means for registering a domain name to a Registrant, said registering means further comprising:
      i) means for collecting at least one identity-related data from said Registrant; and
      ii) means for generating at least one Registrant Profile from said at least one identity-related data;
   b) a plurality of social websites hosted on at least one server computer communicatively coupled to a Network, at least one of said plurality of social websites having a public webpage for said Registrant; and
   c) a Personal Portal Website accessible to said Registrant via said Network and providing said Registrant a single website to access, view, and manage a plurality of social websites, said Personal Portal Website being hosted on at least one of said at least one server computer communicatively coupled to said Network and said means for registering, and further comprising:
      i) means for authenticating said Registrant using an OpenID standard;
      ii) means for transferring at least one data to at least one of said plurality of social websites, said at least one data comprising said identity-related data, said at least one Registrant Profiles, and/or any combination thereof;
      iii) means for logging said Registrant into at least one of said plurality of social websites after said Registrant is authenticated;
      iv) means for generating a Social Domain by concatenating at least one subdomain to said domain name;
      v) means for mapping said Social Domain to a URL for said public webpage for said Registrant; and;
      vi) means for displaying said Registrant's public webpage from at least one of said plurality of social websites when said Social Domain is entered in a browser; and
      vii) means for displaying said Registrant's private webpage from at least one of said plurality of social websites after said Registrant is authenticated.

* * * * *